(12) United States Patent
Suzuki et al.

(10) Patent No.: US 11,679,460 B2
(45) Date of Patent: Jun. 20, 2023

(54) THREE-DIMENSIONAL MEASUREMENT DEVICE

(71) Applicant: HEXAGON METROLOGY KABUSHIKI KAISHA, Sagamihara (JP)

(72) Inventors: Satoshi Suzuki, Hamamatsu (JP); Masahiro Suzuki, Hamamatsu (JP); Yohichi Sano, Hamamatsu (JP)

(73) Assignee: HEXAGON METROLOGY KABUSHIKI KAISHA, Sagamibara (JP)

( * ) Notice: Subject to any disclaimer, the term of this patent is extended or adjusted under 35 U.S.C. 154(b) by 387 days.

(21) Appl. No.: 16/464,640

(22) PCT Filed: Nov. 28, 2017

(86) PCT No.: PCT/JP2017/042648
§ 371 (c)(1),
(2) Date: May 28, 2019

(87) PCT Pub. No.: WO2018/101268
PCT Pub. Date: Jun. 7, 2018

(65) Prior Publication Data
US 2019/0375066 A1 Dec. 12, 2019

(30) Foreign Application Priority Data
Nov. 29, 2016 (JP) .............................. JP2016-231200

(51) Int. Cl.
*B23Q 3/157* (2006.01)
*B23Q 17/22* (2006.01)
*G01B 11/25* (2006.01)

(52) U.S. Cl.
CPC ......... *B23Q 3/15713* (2013.01); *B23Q 17/22* (2013.01); *G01B 11/25* (2013.01); *B23Q 3/1574* (2013.01); *Y10T 483/1757* (2015.01)

(58) Field of Classification Search
CPC ........ Y10T 483/1705; Y10T 483/1733; B23Q 3/15573; B23Q 3/15713; B23Q 17/20;
(Continued)

(56) References Cited

U.S. PATENT DOCUMENTS

| | | | | |
|---|---|---|---|---|
| 4,916,339 A | * | 4/1990 | Lloyd | G01B 7/002 327/19 |
| 5,615,489 A | * | 4/1997 | Breyer | G01B 5/012 33/503 |

(Continued)

FOREIGN PATENT DOCUMENTS

| | | | | |
|---|---|---|---|---|
| DE | 102016100308 A1 | * | 7/2017 | ........... B23Q 17/249 |
| JP | 06229726 A | * | 8/1994 | |

(Continued)

OTHER PUBLICATIONS

European Search Report in Application No. 17876139.1 dated Jul. 10, 2020.

*Primary Examiner* — Erica E Cadugan
*Assistant Examiner* — Michael Vitale
(74) *Attorney, Agent, or Firm* — Maschoff Brennan

(57) ABSTRACT

Provided is a three-dimensional measurement device applicable to a machining machine. A sensor head contains a body and a collet chuck. A light emitting window and a light receiving window are provided on the front end of the body. A non-contact sensor is incorporated in the body. Laser light emitted by the non-contact sensor is radiated onto a workpiece through the light emitting window. Laser light reflected from the surface of the workpiece is received by the light receiving window. A collet chuck is attached to the rear end of the body. The collet chuck has the same shape as a (Continued)

collet chuck provided by each tool housed in a tool magazine of a machining center.

15 Claims, 6 Drawing Sheets

(58) Field of Classification Search
CPC ............ B23Q 17/2452; B23Q 17/2471; B23Q 17/249; G01B 5/004; G01B 5/008; G01B 5/012; G01B 11/055; G01B 11/007
USPC ............ 483/18, 30; 356/2, 601–613; 33/503
See application file for complete search history.

(56) References Cited

U.S. PATENT DOCUMENTS

| | | | | |
|---|---|---|---|---|
| 6,163,973 | A * | 12/2000 | Matsumiya | G01B 11/303 |
| | | | | 33/503 |
| 6,301,796 | B1 | 10/2001 | Cresson | |
| 6,370,789 | B1 * | 4/2002 | Madlener | B23Q 17/20 |
| | | | | 33/366.15 |
| 7,227,647 | B2 * | 6/2007 | Ferger | G01B 5/285 |
| | | | | 250/433 |
| 7,866,056 | B2 * | 1/2011 | Ould | G01B 21/042 |
| | | | | 33/503 |
| 7,970,488 | B2 * | 6/2011 | Prestidge | G01B 21/047 |
| | | | | 73/1.01 |
| 8,141,261 | B2 | 3/2012 | Engel et al. | |
| 9,333,607 | B2 | 5/2016 | Suzuki et al. | |
| 2004/0185706 | A1 * | 9/2004 | Price | G05B 19/128 |
| | | | | 439/488 |
| 2009/0049704 | A1 * | 2/2009 | Styles | G01B 21/047 |
| | | | | 33/503 |
| 2010/0241267 | A1 | 9/2010 | Nishikawa et al. | |
| 2011/0173827 | A1 | 7/2011 | Bailey et al. | |
| 2015/0073584 | A1 | 3/2015 | Goodale et al. | |
| 2015/0253125 | A1 * | 9/2015 | Pettersson | G06F 3/0488 |
| | | | | 715/771 |
| 2016/0016274 | A1 | 1/2016 | Grau | |
| 2016/0077515 | A1 * | 3/2016 | Pfeffer | G01B 11/2513 |
| | | | | 700/160 |
| 2019/0178618 | A1 * | 6/2019 | McMurtry | G01B 5/012 |
| 2019/0376777 | A1 * | 12/2019 | Styles | G01B 5/008 |

FOREIGN PATENT DOCUMENTS

| | | |
|---|---|---|
| JP | H11-2514 A | 1/1999 |
| JP | 2006177843 A * | 7/2006 |
| JP | 2006-255826 A | 9/2006 |
| JP | 2010-089185 A | 4/2010 |
| JP | 2013-088341 A | 5/2013 |
| JP | 2014-163807 A | 9/2014 |
| WO | 2012/157126 A1 | 11/2012 |

* cited by examiner

Fig. 3
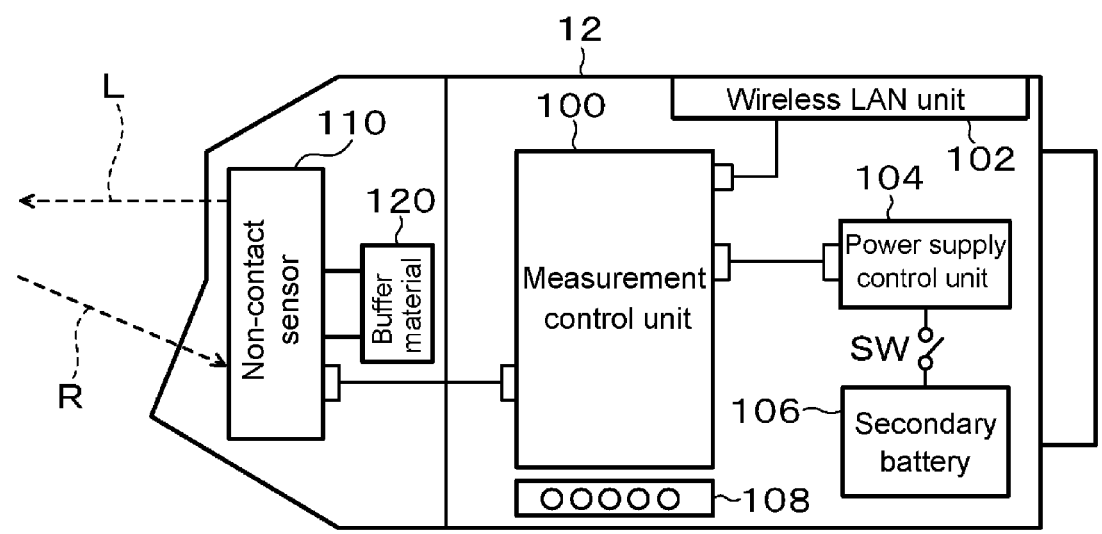
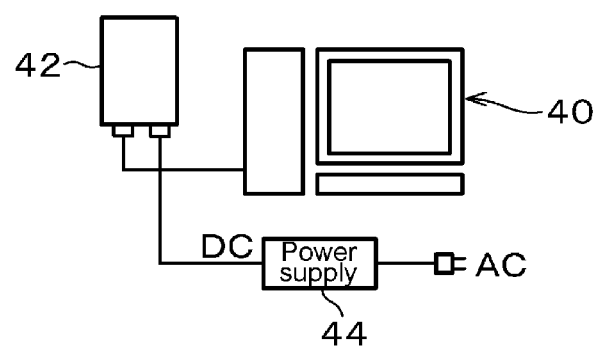

Fig. 5a (a) Time Alignment

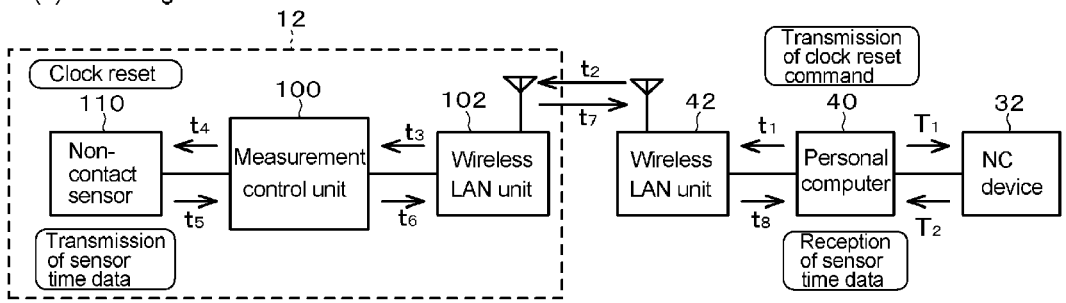

Time stamp error tse between non-contact sensor and personal computer = $(t_1+t_2+t_3+t_4+t_5+t_6+t_7+t_8)/2$ Time stamp error Tne between NC device and personal computer = $(T_1+T_2)/2$ Sensor time data $\cdots h:m:s.\mu s$,
NC control time data $\cdots H:M:S.\mu s$ ⇒ [Measurement data and coordinate data used to calculate location data]

$$(h:m:s.\mu s) - t_{se} = (H:M:S.\mu S) - T_{ne}$$

$$\therefore H:M:S.\mu S = h:m:s.\mu s - t_{se} + T_{ne}$$

Fig. 5b (b) Calculation of Location Data

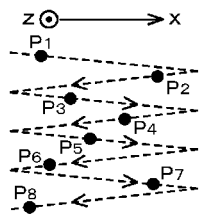

| Measurement point | Coordinate data | Coordinate time data |
|---|---|---|
| P1 | X1,Y1,Z1,i1,j1,k1 | H1:M1:S1.uS1 |
| P2 | X2,Y2,Z2,i2,j2,k2 | H2:M2:S2.uS2 |
| P3 | X3,Y3,Z3,i3,j3,k3 | H3:M3:S3.uS3 |
| ⋮ | ⋮ | ⋮ |

| Measurement data | Sensor time data | Conversion time | Remarks |
|---|---|---|---|
| x1,z1 | h1:m1:s1.us1 | Ha:Ma:Sa.uSa | |
| x2,z2 | h2:m2:s2.us2 | H1:M1:S1.uS1 | Location data of P1 calculated based on (x2,z2) and (X1,Y1,Z1,i1,j1,k1) |
| x3,z3 | h3:m3:s3.us3 | Hb:Mb:Sb.uSb | |
| ⋮ | ⋮ | ⋮ | |
| xm-1,zm-1 | hm-1:mm-1:sm-1.usm-1 | Hc:Mc:Sc.uSc | |
| xm,zm | hm:mm:sm.usm | H2:M2:S2.uS2 | Location data of P2 calculated based on (xm,zm) and (X2,Y2,Z2,i2,j2,k2) |
| xm+1,zm+1 | hm+1:mm+1:sm+1.usm+1 | Hd:Md:Sd.uSd | |
| ⋮ | ⋮ | ⋮ | |
| xn-1,zn-1 | hn-1:mn-1:sn-1.usn-1 | He:Me:Se.uSe | |
| xn,zn | hn:mn:sn.usn | H3:M3:S3.uS3 | Location data of P3 calculated based on (xn,zn) and (X3,Y3,Z3,i3,j3,k3) |
| xn+1,zn+1 | hn+1:mn+1:sn+1.usn+1 | Hf:Mf:Sf.uSf | |
| ⋮ | ⋮ | ⋮ | |

THREE-DIMENSIONAL MEASUREMENT DEVICE

TECHNICAL FIELD

The present invention relates to a three-dimensional measurement device that measures the shape of a processing target using a computer numerical controlled machine tool.

BACKGROUND ART

Computer numerical controlled machine tools (to be referred to as "CNC devices") are known in the prior art. Workpieces (processing targets) can be processed by these CNC devices. The shape of the workpiece after processing is measured in order to confirm the processing accuracy of the workpiece. The device disclosed in Patent Document 1 is known to be a workpiece shape measurement device.

The measurement device disclosed in Patent Document 1 replaces a tool used for processing with a non-contact sensor such as a touch probe following completion of machining by a CNC three-axis machine tool. Next, the probe head of the touch probe is brought in close proximity to or contacted with the surface of the workpiece. The shape of the workpiece can be measured based on numeric data acquired by the touch probe.

In addition, a CNC device is known that is provided with a coordinate measuring machine (CMM). In this device, after the shape of the workpiece is measured by the CMM, the workpiece is returned to the CNC device where processing is resumed. Consequently, this device has the problem of requiring a large number of processing steps.

PRIOR ART DOCUMENTS

Patent Documents

[Patent Document 1] Japanese Unexamined Patent Publication No. 2013-088341

DISCLOSURE OF THE INVENTION

Problems to be Solved by the Invention

CNC devices referred to as machining centers are known that are provided with a tool magazine housing multiple types of tools and allow the tool to be changed with an automatic tool changer according to the type of processing. The tool magazine is able to house not only tools, but also a sensor for measuring the shape of a workpiece surface. The tool used for processing can be replaced with a sensor by the automatic tool changer. According to these machining centers, the shape of a workpiece can be measured directly following completion of workpiece processing. According to these machining centers, the workload required to measure the shape of a workpiece can be reduced considerably.

According to these machining centers, a tool used for processing can be replaced with another tool housed in the tool magazine by the automatic tool changer. However, in these machining centers, the sensor and measurement device body cannot be connected with a cable. Consequently, it is difficult to supply power to the sensor. In addition, it is also difficult to receive measurement data output from the sensor.

With the foregoing in view, an object of the present invention is to provide a three-dimensional measurement device that can be applied to a machining machine.

More specifically, an object of the present invention is to provide a three-dimensional measurement device having a sensor that can be treated in the same manner as other tools in a machining machine.

Means for Solving the Problems

Means for solving the aforementioned problems consist of the inventions indicated below.

(1) A three-dimensional measurement device for measuring the shape of the surface of a target processed by a machine tool; wherein, the machine tool is provided with a housing unit for housing tools, a rotating shaft for rotating the tools, and an automatic tool changing device that removes a tool housed in the housing unit and replaces it with the tool attached to the rotating shaft, a measurement unit that outputs measurement data corresponding to the distance from the surface of the processed target, and a shape data generation unit that generates shape data corresponding to the shape of the target based on the measurement data; and wherein, the measurement unit is provided with a wireless communication means that transmits the measurement data to the shape data generation unit and housed in the housing unit; and, the automatic tool changing device is able to attach a measurement unit housed in the housing unit to the rotating shaft.

(2) The three-dimensional measurement device described in (1) above, wherein the measurement unit transmits the measurement data and the time at which the measurement data was acquired to the shape data generation unit, and the shape data generation unit generates the shape data based on measurement data received from the measurement unit and location information of the rotating shaft at the time at which the measurement data was acquired.

(3) The three-dimensional measurement device described in (1) or (2) above, wherein the measurement unit has a non-contact sensor and outputs the measurement data based on the detection results of the non-contact sensor.

(4) The three-dimensional measurement device described in (3) above, wherein the non-contact sensor has:

a light radiation unit that radiates spotlight onto the surface of the target, and an imaging unit that captures an image of the spotlight reflected from the surface of the target; and, the measurement unit outputs the measurement data based on the location of the image of the spotlight captured by the imaging unit.

(5) The three-dimensional measurement device described in (3) above, wherein the non-contact sensor has:

a light radiation unit that radiates a line of light onto the surface of the target, an imaging unit that captures an image of the line of light reflected from the surface of the target, and a lens that forms an image of the reflected light on the imaging unit; and, the measurement unit outputs the measurement data based on the curvature of the line of light captured by the imaging unit.

(6) The three-dimensional measurement device described in any of (3) to (5) above, wherein the measurement unit has a contact sensor and outputs either of first measurement data based on detection results of the contact sensor or second measurement data based on detection results of the non-contact sensor.

(7) The three-dimensional measurement device described in any of (1) to (6) above, wherein the measurement unit is provided with an electrical power generation means for supplying electrical power.

(8) The three-dimensional measurement device described in (7) above, wherein the measurement unit is provided with a power supply control means that controls the supply and stoppage of electrical power by the electrical power generation means.

(9) The three-dimensional measurement device described in (8) above, wherein the power supply control means has an acceleration sensor and controls the supply and stoppage of electrical power by the electrical power generation means based on a detection signal from the acceleration sensor.

(10) The three-dimensional measurement device described in any of (7) to (9) above, wherein the electrical power generation means is a secondary battery and is provided with a charging unit that charges the secondary battery, and the secondary battery is charged by the charging unit by connecting the measurement unit and the charging unit with the automatic tool changing device.

(11) The three-dimensional measurement device described in any of (1) to (10), which is provided with an oil resistance and waterproof function that prevents dust and other fine particles from entering inside as well as the effects of water splashed from any direction.

Effects of the Invention

According to the present invention, a three-dimensional measurement device can be provided that can be applied to a machining machine.

BRIEF DESCRIPTION OF THE DRAWINGS

FIG. 3 is a functional block diagram for realizing the function of a sensor head.

FIG. 5a is a drawing for explaining the method used to calculate shape data of a measured object with a three-dimensional measurement device according to an embodiment of the present invention. FIG. 5b is a drawing for explaining the method used to calculate shape data of a measured object with a three-dimensional measurement device according to an embodiment of the present invention.

BEST MODE FOR CARRYING OUT THE INVENTION

Figure 1:
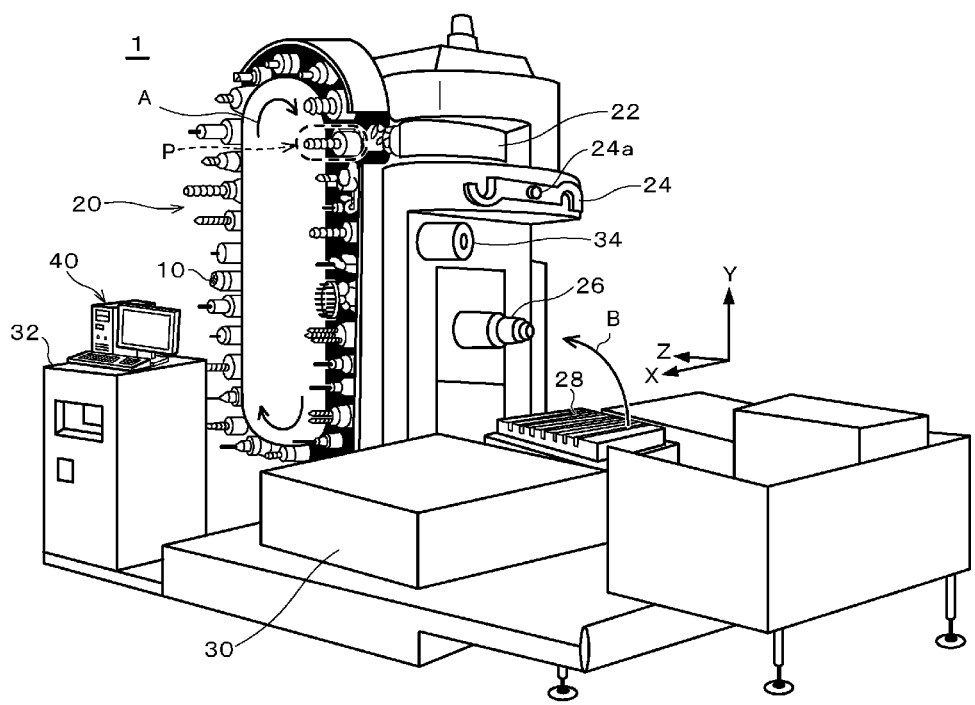
FIG. 1 is a perspective view showing the appearance of a machining center provided with a three-dimensional measurement device according to an embodiment of the present invention.

The following provides an explanation of an embodiment of the three-dimensional measurement device according to the present invention with reference to the drawings. FIG. 1 is a perspective view showing the appearance of a machine tool provided with the three-dimensional measurement device of the present embodiment (to be referred to as a "machining center"). A machining center 1 is a so-called horizontal type machining center. The machining center 1 is provided with a tool magazine 20, an intermediate arm 22, an automatic tool changer (ATC) arm 24, a spindle 26, a pallet 28, a table 30, a numerical control (NC) device 32 and a cutting oil tank.

Multiple types of tools are housed in the tool magazine 20. The tool magazine 20 is able to rotate these tools in the direction indicated by arrow A in the drawing. The tool magazine 20 is able to move a tool used for processing to a home position P.

The intermediate arm 22 removes a tool that has moved to the home position P from the tool magazine 20 and transfers it to the ATC arm 24. The ATC arm 24 attaches the tool received from the intermediate arm 22 to the spindle 26 by rotating the tool centering on a shaft 24a. In the case the tool is already attached to the spindle 26, the ATC arm 24 removes the attached tool from the spindle 26 followed by attaching the tool received from the intermediate arm 22 to the spindle 26. After having been removed from the spindle 26, the tool is returned to the home position P of the tool magazine 20 by the intermediate arm.

The tool magazine 20 corresponds to the "housing unit" of the present invention. The intermediate arm 22 and the ATC arm 24 correspond to the "automatic tool changing device" of the present invention. The spindle 26 corresponds to the "rotating shaft" of the present invention.

A target to be processed (to be referred to as a "workpiece") is placed and immobilized on the pallet 28. The pallet 28 causes the target to oppose a tool attached on the spindle 26 by rotating in the direction of arrow B in FIG. 1 and rising up. The table 30 moves the pallet 28 in the directions of the X axis, Y axis and Z axis shown in FIG. 1 in accordance with a control signal output from the NC device 32. The NC device 32 outputs a control signal for tilting the tool relative to a workpiece W to the table 30. As a result, in the case of, for example, a CNC device employing five-axis control, the spindle 26 can be tilted in the directions of two axes relative to the workpiece W. In this manner, the machining center 1 is able to process a target by rotating a tool with the intermediate arm 22 and controlling the location and orientation of the workpiece relative to the rotating tool with the NC device 32.

After the workpiece has been processed, a sensor head 10 housed in the tool magazine 20 is moved to the home position P. Next, the tool attached to the spindle 26 is replaced with the sensor head 10 by the intermediate arm 22 and the ATC arm 24. Next, the NC device 32 changes the location (X, Y, Z) and orientation (biaxial) of the workpiece relative to the sensor head 10 attached to the spindle 26 in accordance with a preset pattern. Furthermore, movement of the pallet 28 during measurement is carried out only in the directions of the X, Y and Z axes. During this time, the sensor head 10 outputs measurement data corresponding to a distance x from the workpiece at a prescribed time interval (such as every 50 microseconds). A personal computer 40 generates shape data indicating the shape of the workpiece based on measurement data output from the sensor head 10 and data indicating the location and orientation of the workpiece. The sensor head 10 corresponds to the "measurement unit" of the present invention. The personal computer 40 corresponds to the "shape data generation unit" of the present invention.

A charging post 34 for charging a secondary battery (to be subsequently described) within the sensor head 10 is provided within the range of movement of the ATC arm 24. The charging post 34 corresponds to the "charging unit" of the present invention. The charging post 34 has a connector that fits into a connector (not shown) provided in the surface of the sensor head 10. In the case of charging the aforementioned secondary battery, the connector of the sensor head 10 is fit into the connector of the charging post 34 by the ATC arm 24.

The secondary battery may be charged each time measurement is carried out by the sensor head 10. Alternatively, the secondary battery may be charged when the stored charge of the secondary battery has fallen below a prescribed level. The secondary battery may also be charged by fitting the connector of the sensor head 10 into the connector of the charging post 34 as was previously described. Alternatively, the secondary battery may be charged by non-contact charging (such as with an electromagnetic induction system).

Figure 2A:
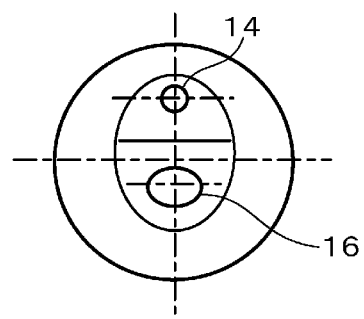
FIG. 2a is an external view showing the appearance of a sensor head of a three-dimensional measurement device.
Figure 2B:
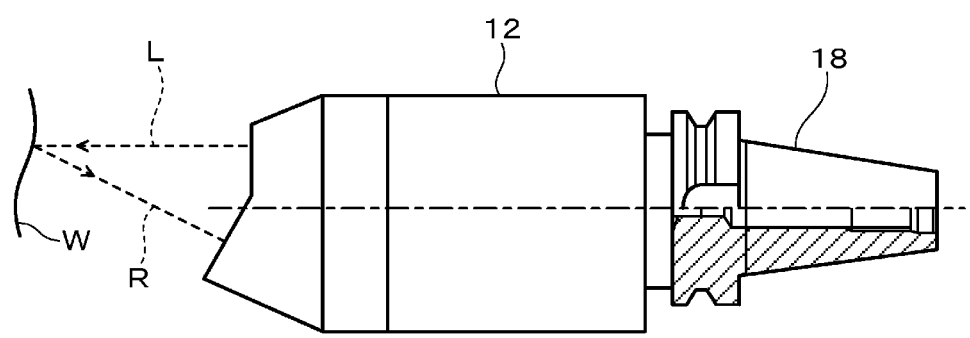
FIG. 2b is an external view showing the appearance of a sensor head of a three-dimensional measurement device.
Figure 2C:
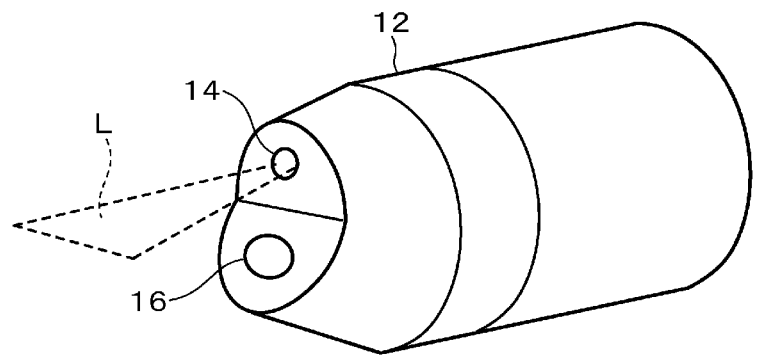
FIG. 2c is an external view showing the appearance of a sensor head of a three-dimensional measurement device.

The following provides an explanation of the sensor head 10 with reference to FIG. 2. FIG. 2a is a front view of the sensor head 10. FIG. 2b is a side view of the sensor head 10. FIG. 2c is a perspective view showing the appearance of the sensor head 10. As shown in these drawings, the sensor head 10 is provided with a body 12 and a collet chuck 18. The body 12 incorporates components for measuring the distance to a workpiece. The collet chuck 18 can be removably coupled to the spindle 26.

A light emitting window 14 and a light receiving window 16 are provided on the front end (left end in FIG. 2b) of the body 12. Laser light L emitted from a non-contact sensor incorporated in the body 12 is radiated onto the workpiece W through the light emitting window 14. Laser light R (reflected light) that has reflected from the surface of the workpiece W passes through the light receiving window 16.

The collet chuck 18 is attached to the rear end (right end in FIG. 2b) of the body 12. The collet chuck 18 has the same shape as tools housed in the aforementioned tool magazine 20. The sensor head 10 can be attached to the spindle 26 by the collet chuck 18 in the same manner as other tools.

The oil resistance/waterproof function of the sensor head 10 is preferably rated at IP64 or better according to the IP code. Namely, the protection level with respect to the human body or solid objects (first symbol) is preferably "6" or better (dustproof), and the protection level with respect to entry of water (second symbol) is preferably "4" or better (protection against splashing).

The following provides an explanation of the configuration of each component provided within the body 12 with reference to FIG. 3. A measurement control unit 100, a wireless LAN unit 102, a power supply control unit 104, a secondary battery 106, a monitor 108, a non-contact sensor 110 and a buffer material 120 are provided within the body 12. The measurement control unit 100 acquires data output from the non-contact sensor 110 every 50 microseconds. The measurement control unit 100 generates measurement data containing measurement information relating to the distance to the workpiece W each time data output from the non-contact sensor 110 is acquired. The measurement control unit 100 transmits generated measurement data to the personal computer 40 with the wireless LAN unit 102. The measurement control unit 100 has a clock (clock means) that generates time information. Measurement data transmitted to the personal computer 40 contains time information indicating the time at which the measurement data was generated. The wireless LAN unit 102 corresponds to the "wireless communication means" of the present invention.

Measurement data transmitted from the wireless LAN unit 102 is received by the wireless LAN unit 102 connected to the personal computer 40. The personal computer 40 generates shape data indicating the shape of the workpiece W based on this received measurement data. A power supply 44 supplies electrical power to the personal computer 40 and the wireless LAN unit 42 by converting alternating current electrical power to direct current electrical power.

The non-contact sensor 110 is fixed within the body 12 through the buffer material 120. The sensor head 10 vibrates when the sensor head 10 is removed from the spindle 26. The sensor head 10 also vibrates when the sensor head 10 is moved between the spindle 26 and the tool magazine 20. The non-contact sensor 110 is protected from vibrations applied to the sensor head 10 by the buffer material 120.

When the power supply control unit 104 is switched on, electrical power generated by the secondary battery 106 is supplied to the measurement control unit 100. An acceleration sensor is provided within the power supply control unit 104. The power supply control unit 104 interrupts the supply of electrical power to the measurement control unit 100 in the case, for example, a detection signal such as a vibration detection signal is not output from this acceleration sensor causing the measurement control unit 100 to enter a so-called sleep mode. When the power supply control unit 100 has entered this sleep mode, the supply of electrical power to the measurement control unit 100 is resumed in the case the acceleration sensor has detected a prescribed acceleration pattern and causes the power supply control unit 100 to leave the sleep mode. Here, a "prescribed acceleration pattern" refers to the case in which acceleration of a prescribed value or higher has been continuously detected for a prescribed amount of time or longer. Alternatively, a "prescribed acceleration pattern" refers to the case in which acceleration of a prescribed value or higher has been detected a prescribed number of times within a prescribed amount of time.

In this manner, the power supply control unit 104 enters a sleep mode when there is a high possibility of the sensor head 10 not being used, thereby making it possible to curtail the consumption of electrical power generated by the secondary battery 106. The secondary battery 106 corresponds to the "electrical power generation means" of the present invention. The power supply control unit 104 corresponds to the "power supply control means" of the present invention.

The monitor 108 is composed of a plurality of LEDs. Each LED lights and goes out corresponding to the on/off status of each type of signal within the measurement control unit 100. The operating status of the measurement control unit 100 can be checked according to the lit status of each LED. In addition, the connection status between the measurement control unit 100, the wireless LAN unit 102, the power supply control unit 104 and the non-contact sensor 110 can also be checked according to the lit status of each LED.

As was previously described, the collet check 18 is provided in the sensor head 10. The sensor head 10 is housed in the aforementioned tool magazine 20. As a result of being provided with the sensor head 10, the sensor head 10 can be attached to and removed from the spindle 26 in the same manner as other tools housed in the tool magazine 20. The sensor head 10 can be attached to and removed from the spindle 26 by the intermediate arm 22 and the ATC arm 24.

The sensor head 10 has the wireless LAN unit 102. The sensor head 10 is able to transmit measurement data to the personal computer 40 by wireless communication using the wireless LAN unit 102. The sensor head 10 and the personal computer 40 are not required to be connected with a cable.

The sensor head 10 and the personal computer 40 are not required to be connected with a cable. Thus, the shape of a workpiece can be measured following completion of processing of the workpiece by the machining center 1. As a result, the workload required to measure the shape of a workpiece can be reduced considerably.

Figure 4A:
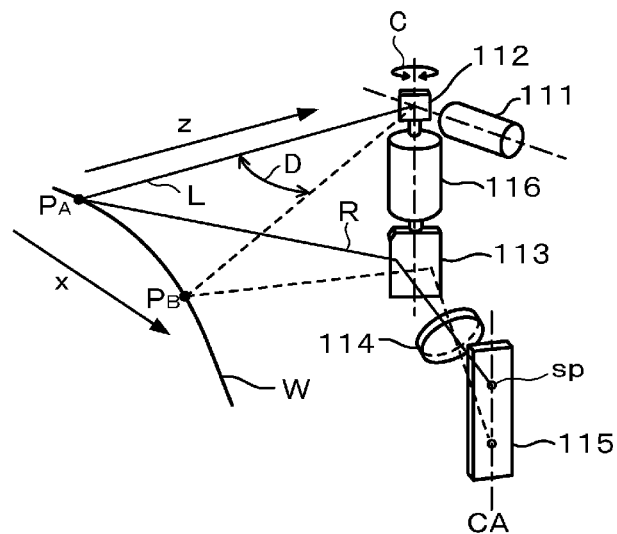
FIG. 4a is a drawing for explaining the measurement principle of a sensor head.
Figure 4B:
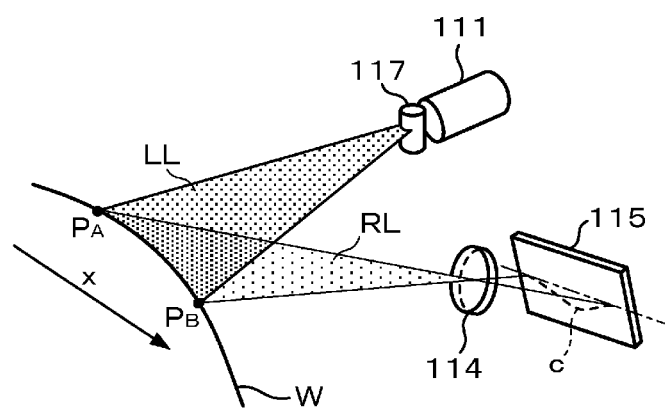
FIG. 4b is a drawing for explaining the measurement principle of a sensor head.

The following provides an explanation of the configuration of the previously described non-contact sensor 110 with reference to FIG. 4. FIG. 4a indicates the configuration of a flying spot laser type of non-contact sensor. FIG. 4b indicates the configuration of a fixed line laser type of non-contact sensor.

As shown in FIG. 4a, a flying spot laser type of non-contact sensor is composed of a laser diode 111, galvanometer mirrors 112 and 113, a lens 114, a CCD 115 and a scanning motor 116. Laser light L emitted from the laser diode 111 is reflected towards the workpiece W by the galvanometer mirror 112, passes through the light emitting window 14 (see FIG. 2), and is reflected at a measurement point P on the surface of the workpiece W. Reflected light R reflected from the measurement point P passes through the light receiving window 16 shown in FIG. 2 and is reflected towards the lens 114 by the galvanometer mirror 113.

The reflected light R forms an image in the form of spotlight (point of light) sp on a prescribed axis CA of the light receiving portion of the CCD 115 composed of a plurality of light receiving elements. Imaging data of the spotlight sp is output to the measurement control unit 100 together with time data for that point in time. The CCD 115 corresponds to the "imaging unit" of the present invention. The location of the spotlight sp on the axis CA differs according to the distance between the sensor head 10 and the measurement point P. The measurement control unit 100 (see FIG. 3) outputs a distance z between the sensor head 10 and the measurement point P corresponding to the location of the spotlight sp on the axis CA based on imaging data output from the CCD 115.

The aforementioned galvanometer mirrors 112 and 113 are fixed to the drive shaft of the scanning motor 116. The drive shaft of the scanning motor 116 is able to rotate in the direction indicated by arrow C in FIG. 4a. Laser light L makes periodic scans so as to move back and forth over a prescribed range on the x axis (such as between measurement points $P_A$ and $P_B$ on the surface of the workpiece W) as indicated with arrow D. The measurement control unit 100 transmits measurement data to the personal computer 40. The measurement data contains the value of distance z and time data as previously described. Measurement data further contains information relating to the location of the laser light L on the x axis. Alternatively, measurement data contains information relating to the angle of the drive shaft of the scanning motor 116.

In the case of using a flying spot laser type of non-contact sensor, intensity of the laser light can be adjusted corresponding to the state of the surface of the workpiece W (such as the color or reflectance thereof). Consequently, in the case of using a flying spot laser type of non-contact sensor, distance from the workpiece W can be measured accurately. On the other hand, a flying spot laser type of non-contact sensor is expensive due to the complexity of the structure thereof.

As shown in FIG. 4b, a fixed line laser type of non-contact sensor is composed of the laser diode 111, a cylindrical lens (or Powell lens) 17, the lens 114 and a CMOS image sensor (to simply be referred to as a "CMOS"). Laser light emitted from the laser diode 111 is spread out in the direction of the x axis in FIG. 4b by the cylindrical lens (or Powell lens) 117. Thus, laser light emitted from the laser diode 111 is in the form of a line of light (a single line of linear light) LL. The line of light LL passes through the light emitting window 14 (see FIG. 2) and is radiated onto a line extending from measurement point $P_A$ to measurement point $P_B$ on the surface of the workpiece W.

Reflected light RL of the line of light LL passes through the light receiving window 16 (see FIG. 2), is focused by the lens 114, and an image thereof is formed on the light receiving portion of the CMOS 115. The formed image is in the form of a line of light that is captured by the CMOS 115. This imaging data is output to the measurement control unit 100 together with time data of the point in time at which the image was captured. The line of light captured by the CMOS 115 depicts a curve c corresponding to the shape from the measurement point $P_A$ to the measurement point $P_B$ on the workpiece W. The measurement control unit 100 calculates the distance between the sensor head 10 and a prescribed location on the line extending from the measurement point $P_A$ to the measurement point $P_B$ based on the curve c. The measurement control unit 100 then transmits measurement data containing the calculated distance value and the aforementioned time data to the personal computer 40 with the wireless LAN unit 102.

A fixed line laser type of non-contact sensor does not allow for fine adjustment of the intensity of laser light between measurement points $P_A$ and $P_B$ in the manner of the flying spot laser type of non-contact sensor shown in FIG. 4a.

A fixed line laser type of non-contact sensor enables costs to be reduced due to the simple structure thereof.

The following provides an explanation of a method for calculating shape data of the workpiece W by the personal computer 40 with reference to FIG. 5. Furthermore, the explanation is provided for the case of using the flying spot laser type of non-contact sensor shown in FIG. 4a.

First, prior to calculating shape data of the workpiece W, the personal computer 40 aligns its clock with the time managed by the sensor head 10 (to also be referred to as "sensor local time"). More specifically, as shown in FIG. 5a, the personal computer 40 transmits a clock reset command along with current time data in the personal computer 40 while also starting the clock. The measurement control unit 100 receives the clock reset command and time data via the wireless LAN units 42 and 102. The measurement control unit 100 then sets the time of the clock means within the non-contact sensor 110 to the time indicated by the received time data. The non-contact sensor 110 outputs data indicating the set time (sensor time data) to the measurement control unit 100. As a result, the measurement control unit 100 transmits the sensor time data to the personal computer 40. The personal computer 40 terminates the aforementioned timing when it receives the sensor time data. The personal computer 40 measures the amount of time from transmitting the clock reset command until it receives the sensor time data.

Here, the time of time required for the clock reset command transmitted from the personal computer 40 to reach the wireless LAN unit 42 is defined as $t_1$. The amount of time required for the clock reset command to reach the wireless LAN unit 102 from the wireless LAN unit 42 is defined as $t_2$. The amount of time required for the clock reset command to reach the measurement control unit 100 from the wireless LAN unit 102 is defined as $t_3$. The amount of time required for the measurement control unit 100 to reset the time of the clock means within the non-contact sensor 110 is defined as $t_4$. The amount of time required for sensor time data output from the non-contact sensor 110 to reach the measurement control unit 100 from the non-contact sensor 110 is defined as $t_5$. The amount of time required for the sensor time data to reach the wireless LAN unit 102 from the measurement control unit 100 is defined as $t_6$. The amount of time required for the sensor time data to reach the wireless LAN unit 42 from the wireless LAN unit 102 is defined as $t_7$. The amount of time required for the sensor time data to reach the personal computer 40 from the wireless LAN unit 42 is defined as $t_8$.

In this case, the amount of time required for transmission of information back and forth between the personal computer 40 and the non-contact sensor 110 becomes $t_1+t_2+t_3+t_4+t_5+t_6+t_7+t_8$, and amount of time required for one-way transmission of information can be considered to be the average thereof expressed as $(t_1+t_2+t_3+t_4+t_5+t_6+t_7+t_8)/2$. According to the method indicated in FIG. 5a, in the case of aligning the time of the non-contact sensor 110 with the time of the personal computer 40, the error $t_{se}$ between the time of the non-contact sensor 110 and the time of the personal computer 40 becomes $t_{se}=(t_1+t_2+t_3+t_4+t_5+t_6+t_7+t_8)/2$. This error is hereinafter referred to as "time stamp error".

Similarly, the personal computer 40 aligns its time with the time managed by the NC device 32 (to be referred to as "NC local time"). More specifically, the personal computer 40 transmits a clock reset command to the NC device 32 along with current time data. The NC device 32 aligns the time of its own clock means to the time indicated by the received time data. The NC device 32 then transmits the time of its own clock means to the personal computer 40. Here, the amount of time required for the clock reset command transmitted from the personal computer 40 to reach the NC device 32 is defined as $T_1$. The amount of time required for time data transmitted from the NC device 32 (to be referred to as "coordinate time data") to the personal computer 40 is defined as $T_2$. In this case, time stamp error $T_{ne}$ between the personal computer 40 and the NC device 32 becomes $T_{ne}=(T_1+T_2)/2$.

Coordinate time data can be expressed as H:M:S. μS.

Sensor time data can be expressed as h:m:s, μs.

In this case, the time corresponding to the coordinate time data (H:M:S. μS) becomes the sensor time data (h:m:s, μs)$-t_{se}+T_{ne}$.

In the case of using the flying spot laser type of non-contact sensor 110 shown in FIG. 4a, measurement data (x,z) and sensor time data (h:m:s, μs) are transmitted from the sensor head 10 (and more specifically, the body 12) to the personal computer 40 every 50 microseconds as was previously described. The personal computer 40 stores the received measurement data and sensor time data. In addition, the personal computer 40 receives coordinate data (X,Y,Z,i,j,k) indicating the location of the sensor head 10 relative to the workpiece W from the NC device 32 as well as coordinate time data (H:M:S. μS) indicating the time at the coordinate location thereof at a prescribed time interval. The personal computer 40 then stores the received coordinate data and coordinate time data.

As shown in FIG. 5b, for example, distance z from the surface of the workpiece W is measured while scanning with laser light radiated onto the surface of the workpiece W along the direction of the x axis. The location data of measurement points $P_1, P_2, P_3, \ldots$ is then calculated for the workpiece W. Measurement points $P_1, P_2, P_3, \ldots$ are located on the path of movement of the spindle 26.

In the personal computer 40, coordinate time data for which coordinate data $(X_1,Y_1,Z_1,j_1,k_1)$ of measurement point $P_1$ has been acquired is assumed to be $(H_1:M_1:S_1. \mu S_1)$. Measurement data corresponding to coordinate data $(X_1,Y_1,Z_1,i_1,j_1,k_1)$ is measurement data acquired at time $(H_1:M_1:S_1. \mu S_1)=$(h:m:s, μs) $-t_{se}+T_{ne}$.

As shown in FIG. 5b, for example, the result of subtracting time stamp error $t_{se}$ from sensor time data $(h_2:m_2:s_2, \mu s_2)$ and adding time stamp error $T_{ne}$ becomes time $(H_1:M_1:S_1. \mu S_1)$. In this case, location data of measurement point $P_1$ is calculated based on measurement data $(x_2,z_2)$ and coordinate data $(X_1,Y_1,Z_1,i_1,j_1,k_1)$.

Similarly, location data of measurement point $P_2$ is calculated based on measurement data $(x_m,z_m)$ and coordinate data $(X_2,Y_2,Z_2,i_2,j_2,k_2)$. Location data of measurement point $P_3$ is calculated based on measurement data $(x_n,z_n)$ and coordinate data $(X_3,Y_3,Z_3,i_3,j_3,k_3)$. Location data of each measurement point is calculated in this manner. Next, personal computer 40 calculates interpolation data between each measurement point along the path scanned by the laser light. The personal computer 40 then generates shape data of the workpiece W based on the calculated interpolation data and the location data of each measurement point.

According to the aforementioned method for calculating the shape data of a workpiece, reference is made to the time of the measurement data in the sensor head 10 and the time of the coordinate data of the sensor head 10 relative to the workpiece W in the personal computer 40. Shape data of the workpiece W is then generated based on measurement data and coordinate data at the referenced times.

According to the method described above, measurement data and coordinate data can be made to correspond without having an effect on the time required for information transmission between the sensor head 10 and the personal computer 40.

Thus, the shape of a workpiece can be measured accurately without having to synchronize the local coordinate measurement unit (sensor head 10) and global coordinate measurement unit (NC device 32) as a result of employing wireless communication.

In the configuration shown in FIG. 5a, LAN packet communication is carried out between the wireless LAN unit 42 and the wireless LAN unit 102. Consequently, when aligning the time, the time required for information transmission between the wireless LAN unit 42 and the wireless LAN unit 102 is able to fluctuate in response to noise and other effects.

Thus, when aligning the time as shown in FIG. 5a, there is the risk of it being difficult to align the time accurately due to variations in transmission times $t_2$ and $t_7$. For example, when a clock reset command is transmitted from the wireless LAN unit 42 to the wireless LAN unit 102, there is the risk of it being difficult to accurately align the time. For example, there is also the risk of it being difficult to accurately align the time when sensor time data is transmitted from the wireless LAN unit 102 to the wireless LAN unit 42.

In order to align time more accurately, a clock reset command output from the personal computer 40 can be transmitted to an optical signal transmission unit. Upon reception of a clock reset command, the optical signal transmission unit outputs an optical signal in the form of an on/off signal. An optical signal reception unit is incorporated in the measurement control unit 100. The optical signal reception unit receives an optical signal output from the optical signal transmission unit. When the optical signal reception unit receives an optical signal, the measurement control unit 100 resets the sensor clock. Simultaneous thereto, the optical signal transmission unit transmits the same signal to the NC device 32 via a cable. When the NC device 32 receives this signal, the clock of the NC device 32 is also reset to the same time. In this case, both clocks can be aligned without generating error. More preferably, conditions for optical transmission are set to a close location intense to external noise only at the time of this reset.

Figure 6:
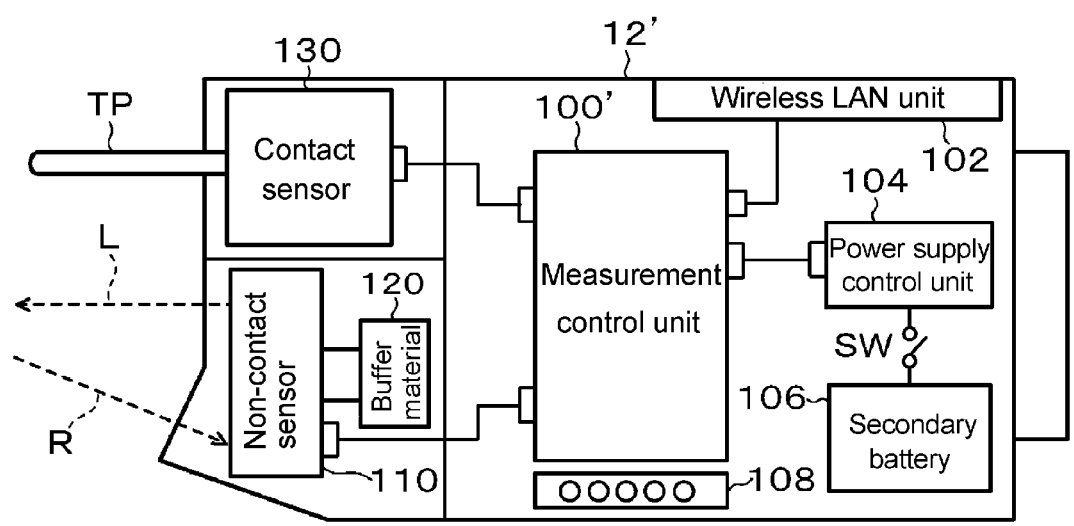
FIG. 6 is a functional block diagram of a sensor head having both a contact sensor and a non-contact sensor.

The body 12 of the sensor head 10 shown in FIG. 3 only has the non-contact sensor 110 as a measurement unit. As shown in FIG. 6, a body 12' may be provided not only with the non-contact sensor 110, but also with a contact sensor 130. In FIG. 6, the same reference symbols are used to indicate those constituents having the same configuration as that shown in FIG. 3 and detailed explanations thereof are omitted.

The contact sensor 130 is provided in the body 12' shown in FIG. 6. For example, when the contact sensor 130 contacts the surface of the workpiece W, it outputs data indicating the time at which contact was made to a measurement control unit 100'. For example, the measurement control unit 100' activates the non-contact sensor 110 or the contact sensor 130 in accordance with an instruction from the personal computer 40. Data output from the activated sensor is transmitted to the personal computer 40. More specifically, in the case the non-contact sensor 110 has been activated, measurement data output from the non-contact sensor 110 is transmitted to the personal computer 40. This measurement data corresponds to the "second measurement data" of the present invention. In the case the contact sensor 130 has been activated, measurement data output from the contact sensor 130 is transmitted to the personal computer 40. This measurement data corresponds to the "first measurement data" of the present invention.

BRIEF DESCRIPTION OF THE REFERENCE SYMBOLS

1 Machining center (machine tool)
10 Sensor head (measurement unit)
12,12' Body
14 Light emitting window
16 Light receiving window
18 Collet chuck
20 Tool magazine (tool housing unit)
22 Intermediate arm (automatic tool changing device)
24 ATC arm (automatic tool changing device)
24a Shaft
26 Spindle (rotating shaft)
28 Pallet
30 Table
32 NC device
34 Charging post
40 Personal computer (shape data generation unit)
42,102 Wireless LAN unit (wireless communication means)
44 Power supply
100,100' Measurement control unit
104 Power supply control unit
106 Secondary battery
108 Monitor
110 Non-contact sensor
111 Laser diode
112,113 Galvanometer mirror
114 Lens
115 CMOS image sensor
116 Scanning motor
117 Cylindrical lens (or Powell lens)
120 Buffer material
130 Contact sensor

The invention claimed is:

1. A three-dimensional measurement system for measuring a shape of a surface of a target processed by a machine tool, wherein:
the machine tool includes a tool magazine, a tool spindle for rotating tools, and an automatic tool changing device that picks up a second tool from the tool magazine and replaces a first tool currently clamped in the tool spindle with the second tool that was picked up from the tool magazine, wherein the machine tool further includes a controller having a controller clock;
the system comprising:
a measurement unit configured to be coupled to the machine tool, wherein the measurement unit is configured to output measurement data corresponding to a distance from the surface of the target processed by the machine tool, wherein the measurement unit includes a sensor, a measurement control unit, and a first wireless communication unit, wherein the measurement control unit includes a measurement control unit clock that generates measurement time data, wherein the measurement data is generated each time that data output from the sensor is acquired, and wherein the measurement data that is transmitted by the first wireless communication unit includes the measurement time data indicating a time at which the measurement data is generated, and
a shape data generation unit that is configured to generate shape data corresponding to the shape of the target based on the measurement data from the measurement unit and based on data indicating a location and an orientation of the target from the controller, wherein the shape data generation unit includes a shape data generation unit clock that is aligned with the measurement control unit clock and that is aligned with the controller clock, and wherein the shape data generation unit is coupled to a second wireless communication unit that is communicatively coupled with the first wireless communication unit,
wherein the shape data generation unit transmits a clock reset command with a current time data of the shape data generation unit to the measurement control unit and to the controller, and starts the shape data generation unit clock,
wherein the measurement control unit receives the clock reset command and time data of the shape data generation unit clock, and sets a time of the measurement control unit clock to a time of the time data of the shape data generation unit clock,
wherein the sensor outputs sensor time data to the measurement control unit,
wherein the first wireless communication unit transmits the sensor time data to the second wireless communication unit,
wherein the shape data generation unit terminates a timing from the restarted shape data generation unit clock and measures an amount of time from transmitting the clock reset command until the shape data generation unit receives the sensor time data to determine a first time stamp error,
wherein the controller aligns the controller clock thereof with the time of the time data of the shape data generation unit clock and transmits the time of the control clock to the shape data generation unit and a second time stamp error is determined between the controller and the shape data generation unit, wherein the measurement control unit clock is aligned with the shape data generation unit clock by correcting for the first time stamp error for a data transmission between the measurement unit and the shape data generation unit, and the controller clock is aligned with the shape data generation unit clock by correcting for the second time stamp error for a data transmission between the controller and the shape data generation unit; and wherein the automatic tool changing device is able to attach the measurement unit to the tool spindle.

2. The three-dimensional measurement system according to claim 1, wherein the measurement unit has a non-contact sensor as the sensor and outputs the measurement data based on detection results of the non-contact sensor.

3. The three-dimensional measurement system according to claim 2, wherein:

the non-contact sensor has:
a light radiation unit that radiates a spotlight onto the surface of the target, and
an imaging unit that captures an image of the spotlight reflected from the surface of the target; and,
the measurement unit outputs the measurement data based on a location of the image of the spotlight captured by the imaging unit.

4. The three-dimensional measurement system according to claim 3, wherein the measurement unit is provided with an oil resistance and waterproof function that prevents dust and other fine particles from entering inside the measurement unit and prevents the effects of water splashed from any direction.

5. The three-dimensional measurement system according to claim 2, wherein:

the non-contact sensor has:
a light radiation unit that radiates a line of light onto the surface of the target,
an imaging unit that captures an image of the line of light reflected from the surface of the target, and
a lens that forms an image of the reflected light on the imaging unit; and, the measurement unit outputs the measurement data based on a curvature of the line of light captured by the imaging unit.

6. The three-dimensional measurement system according to claim 2, wherein the measurement unit further has a contact sensor and outputs either of first measurement data based on detection results of the contact sensor or second measurement data based on detection results of the non-contact sensor.

7. The three-dimensional measurement system according to claim 2, wherein the measurement unit is provided with an oil resistance and waterproof function that prevents dust and other fine particles from entering inside the measurement unit and prevents the effects of water splashed from any direction.

8. The three-dimensional measurement system according to claim 1, wherein the measurement unit is provided with an electrical power generation means for supplying electrical power.

9. The three-dimensional measurement system according to claim 8, wherein the measurement unit is provided with a power supply control means that controls the supply and stoppage of electrical power by the electrical power generation means.

10. The three-dimensional measurement system according to claim 9, wherein the power supply control means has an acceleration sensor and controls the supply and stoppage of electrical power by the electrical power generation means based on a detection signal from the acceleration sensor.

11. The three-dimensional measurement system according to claim 10, wherein:

the electrical power generation means is a secondary battery and is provided with a charging unit that charges the secondary battery, and
the secondary battery is charged by the charging unit by connecting the measurement unit and the charging unit with the automatic tool changing device.

12. The three-dimensional measurement system according to claim 9, wherein:

the electrical power generation means is a secondary battery and is provided with a charging unit that charges the secondary battery, and
the secondary battery is charged by the charging unit by connecting the measurement unit and the charging unit with the automatic tool changing device.

13. The three-dimensional measurement system according to claim 8, wherein:

the electrical power generation means is a secondary battery and is provided with a charging unit that charges the secondary battery, and
the secondary battery is charged by the charging unit by connecting the measurement unit and the charging unit with the automatic tool changing device.

14. The three-dimensional measurement system according to claim 1, wherein the measurement unit is provided with an oil resistance and waterproof function that prevents dust and other fine particles from entering inside the measurement unit and prevents the effects of water splashed from any direction.

15. The three-dimensional measurement system according to claim 1, wherein a time of transmission of the clock reset command from the shape data generation unit to the second wireless communication unit is a first time, a time of transmission of the clock reset command from the second wireless communication unit to the first wireless communication unit is a second time, a time of transmission of the clock reset command from the first wireless communication unit to the measurement control unit is a third time, a time for the measurement control unit to reset the control clock is a fourth time, a time for the sensor time data transmission from the sensor to the measurement control unit is a fifth time, a time for the sensor time data transmission from the measurement control unit to the first wireless communication unit is a sixth time, a time for the sensor time data transmission from the first wireless communication unit to the second wireless communication unit is a seventh time, and a time for the sensor time data transmission from the second wireless communication unit to the shape data generation unit is an eighth time, wherein the first time stamp error between the measurement unit and the shape data generation unit is determined to be a sum of the first time through the eighth time divided by two; and wherein a time of transmission of the clock reset command transmission from the shape data generation unit to the controller is a ninth time, and a time of transmission of controller time data from the controller to the shape data generation unit is a tenth time, wherein the second time stamp error between the shape data generation unit and the controller is determined to be a sum of the ninth time and the tenth time divided by two.

* * * * *